Nov. 21, 1967  C. E. MacFARLANE ETAL  3,353,249
METHOD OF MAKING A FABRICATED VALVE BUSHING
Filed March 25, 1964
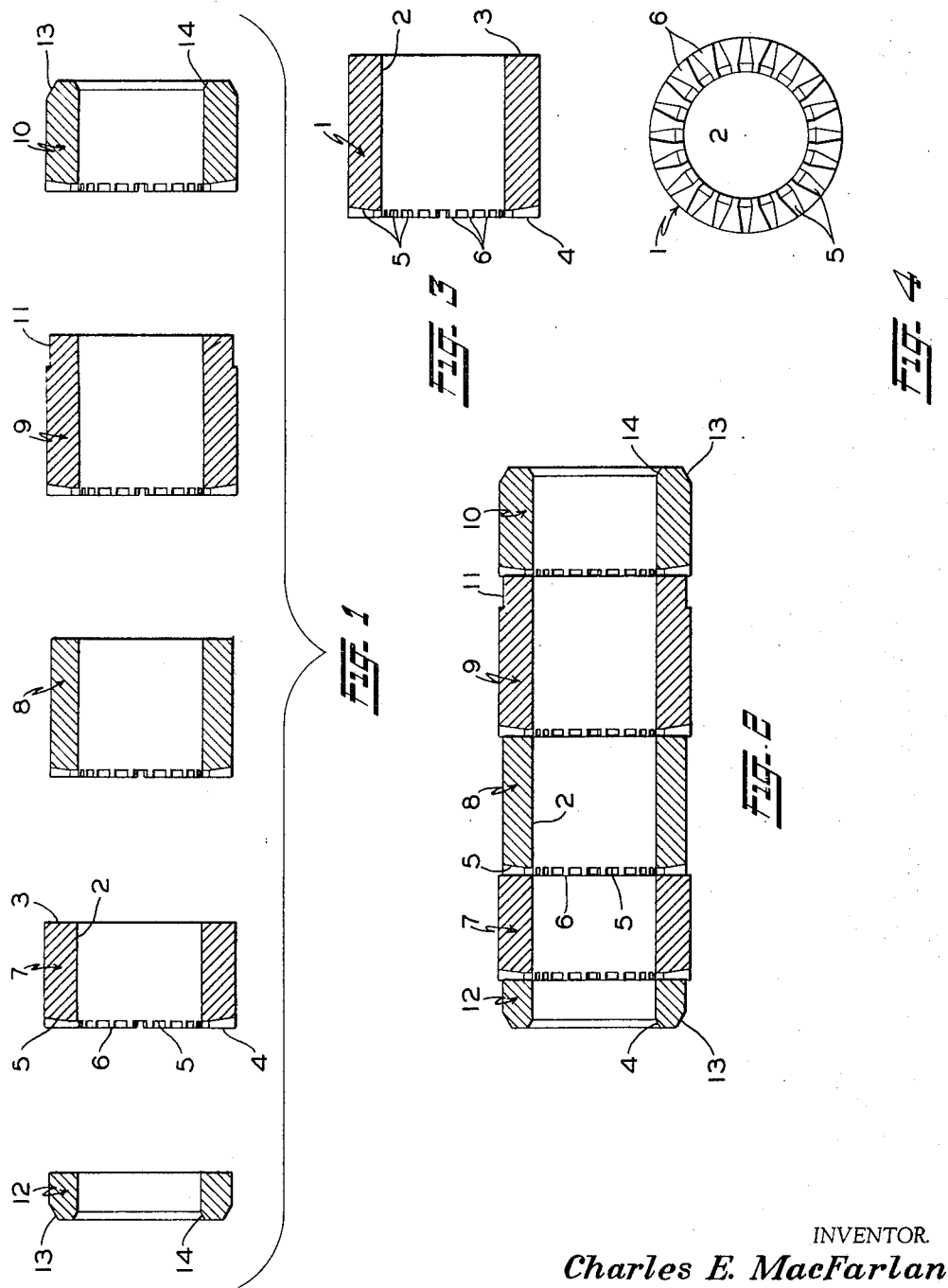
INVENTOR.
Charles E. MacFarlane
BY Carl G. Hoge
Ralph W. McIntire Jr.
Attorney

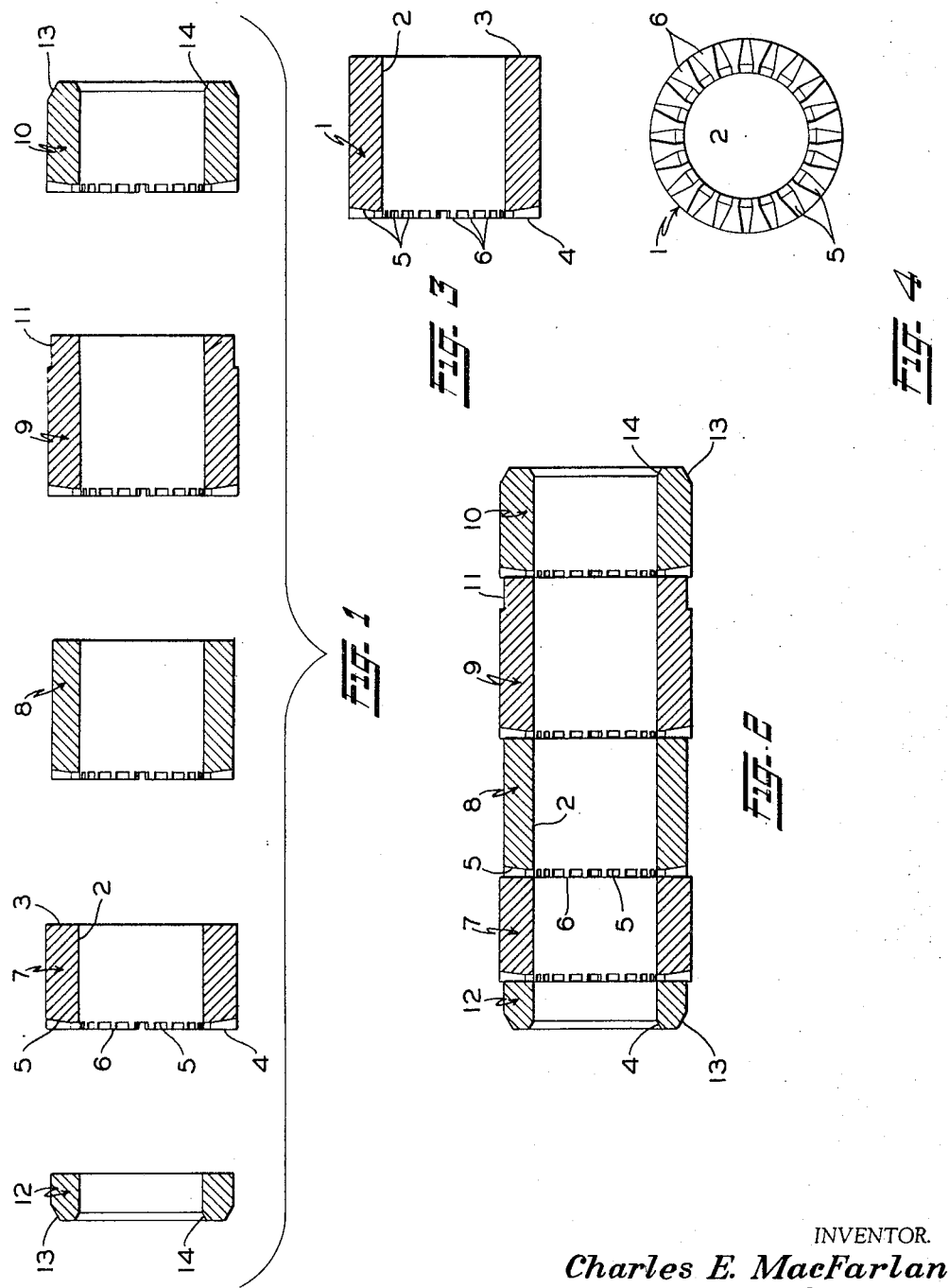

United States Patent Office 3,353,249
Patented Nov. 21, 1967

3,353,249
METHOD OF MAKING A FABRICATED
VALVE BUSHING
Charles E. MacFarlane and Carl G. Hoge, Pittsburgh,
Pa., assignors to Westinghouse Air Brake Company,
Wilmerding, Pa., a corporation of Pennsylvania
Filed Mar. 25, 1964, Ser. No. 354,546
5 Claims. (Cl. 29—157.1)

This invention relates generally to fabricated piston valve bushings, and relates particularly to the method of making fabricated valve bushings of the type having apertures therein for use in the body cavity of a spool valve device.

Heretofore, piston valve bushings have been made of one piece of stainless steel or similar metal having a large number of holes drilled through the bushing to admit fluid pressure from passageways in the valve bore to the valve chamber. Thereafter, the bushing was pressed into position in the valve bore and was machined and line-reamed or honed to condition the bore within the bushing to receive a piston valve member fitted with externally disposed O-rings which slidably engaged the bushing bore. The cost of constructing the valve bushing in this manner amounts to a high percentage of the cost of the total valve structure.

It is the object of the present invention to provide a new method of constructing a piston valve bushing of the type described above in a more economical manner. This object is achieved by constructing the bushing from a plurality of standardized parts, each part comprising a sintered, metal powder segment of the bushing. The sintered segments or sections of the piston valve bushing are pressed and sintered as identical sections which are thereafter machined to a predetermined outside diameter and to a predetermined length, depending upon the desired predetermined spacing between the apertured portions of the bushing, which spacing, in turn, is determined in accordance with the predetermined spacing of holes along the valve cavity for passing fluid from the valve body through the bushing to the center bore of the piston valve bushing.

In the present completed valve bushing, as in previous valve bushings of this type, the holes or fluid ports through the valve bushing extend from the outside diameter thereof to the inside diameter thereof and are equally spaced circumferentially around the completed bushing to form rings or planes of ports, the rings being disposed perpendicular to the axis of the bushing and spaced from each other at predetermined intervals along the bushing. Therefore, in the present invention, by constructing the ports of each ring of ports so that they have at least one flat side lying in a common plane perpendicular to the bushing axis, the complete bushing may be constructed of individual bushing segments, each segment comprising a tubular portion having one end terminating at a plane perpendicular to its axis and the other end terminating in a radially grooved plane disposed perpendicular to its axis, whereby juxtaposing the plane end of one segment with the grooved end of the other will produce one of the aforementioned rings of ports between the two juxtaposed segments. Accordingly, it is seen that a plurality of such identical segments may be juxtaposed to form any number of spaced rings of ports disposed along a bushing of any desired length. Inasmuch as the ports or holes are disposed on the end of each segment during segment construction, the ports are open-side during the pressing and sintering operation upon each segment, thus permitting a complicated shape or form of the holes or ports to be easily and quickly constructed by merely changing the shape of the grooves in the grooved end of each segment. By constructing the ports so that each includes a flat side lying in a common plane, as above described, and by constructing each segment to include a planar end comprising the flat side of the port, the distances between adjacent rings of ports on the fabricated bushing may be easily adjusted during construction of the individual bushing segments to be any desired length by merely shortening selected individual ones of the segments at the plane end thereof after sintering and before fabrication. Thereafter, the segments are assembled in end-to-end relationship with an appropriate bonding agent disposed between the segments. The entire fabricated assembly is heated to cure the bonding agent, resulting in a bushing which is one fabricated piece having the predetermined spacing between the ported areas, as desired. The bushing assembly is then machined to provide an appropriate outside taper suitable to achieve a press fit when the bushing is inserted in the valve cavity. After insertion in the valve cavity, the interior or core of the bushing chamber is reamed to prepare the bushing for receiving a piston valve therein.

These and other objects will become more readily apparent when taken in conjunction with the following description, and the drawings, in which:

FIG. 1 is an exploded side elevational view of a prefabricated valve bushing showing the individual bushing segments;

FIG. 2 is a side elevational view of the valve bushing segments of FIG. 1 shown after fabrication to form a fabricated bushing;

FIG. 3 is a side elevational view of one of the segments after pressing and sintering and before machining; and FIG. 4 is an end elevational view of the segment of FIG. 3.

Referring now to FIGS. 3 and 4 of the drawings, there is shown a standard tubular bushing segment 1 having an axial bore 2 therein. The right end 3 of the segment is a plane extending perpendicular to the segment axis. The left end 4 of the segment is also a plane disposed perpendicular to the segment axis, which plane surface 4 is provided with a plurality of equally spaced, radially extending, identically shaped grooves 5 extending from the central bore 2 to the outer periphery of the segment 1, the remaining ungrooved portions of planar end 4 forming a plurality of land areas 6 disposed between the grooves 5.

Each of the grooves 5 is large in width and shallow in depth at the inner end thereof, the shallow depth facilitating the uninhibited passage of the O-rings of a piston member (not shown) as it moves axially along the bore 2 across the inner openings of the grooves 5 when a plurality of segments are assembled end-to-end, as hereinafter described in detail. The width of each groove 5 decreases along its length extending radially outwardly, thus increasing the width of the plane surface of each land portion 6 for providing a large adhering surface for the cement, as hereinafter described. At the same time, as the width of the groove decreases, the depth of each groove 5 increases along its length extending radially outwardly, to thus maintain the cross-sectional area of each groove substantially the same along its length to facilitate an even flow of fluid through the grooves 5 when assembled with the plane end 3 of another segment, as hereinafter described.

As the first step in the present novel method of producing a fabricated valve bushing, a plurality of the above-described bushing segments 1 are produced by pressing and sintering powdered metal in a die in a fashion well known and heretofore applied to the production of a wide variety of different articles.

As the second step of the present novel method, each bushing segment 1 is machined to size both along its length and outer diameter. Each segment 1 is machined to a predetermined length by shortening the planar end 3 thereof, which shortening process may be the same amount or different amount for each segment 1, as desired, and as determined by the locus of the intersection of fluid passages in the valve body (not shown) with the valve cavity (not shown), in which cavity the bushing is to be press fitted after fabrication. In addition, the outside diameter or certain portions of the outside diameter of each segment 1 is machined to a smaller diameter, as desired, to provide a space between the valve body cavity and the outside diameter of the segment to facilitate fluid passage from the fluid passage apertures in the valve body along the sized outside diameter of the segments to the outer opening of the grooves 5 in the adjacent bushing segment 1.

Referring now to FIG. 1 of the drawings, there is shown a plurality of bushing segments 7, 8, 9 and 10 similar to the previously-described bushing segment 1, each segment being machined as to length and outside diameter, as above described, to properly effect cooperation of the grooves 5 with the fluid passages in the valve body. Particularly, segment 7 has been shortened, segment 8 has been sized throughout its length, segment 9 has been sized at portion 11, and segment 10 has been shortened.

An end segment 12, shown to the left of FIG. 1, has no grooves 5 therein and, accordingly, may be produced either by pressing and sintering, as are the other segments, or may comprise a machined piece of stainless steel, as desired.

As the third step of the novel method of the present invention, an appropriate bonding agent of commercially available type, such as an epoxy adhesive, is applied to the land portion 6 of the left end 4 of each segment as by pressing the end 4 against a pad impregnated with the bonding agent. Thereafter, the bushing segments are coaxially assembled, as by disposition over a mandrel (not shown), with each grooved end 4 of one segment being pressed, as by a spring means (not shown), into abutting relationship with the plane end 3 of the adjacent segment.

As the fourth step of the present novel method, the assembled bushing segments are heated to cure the bonding agent, thus providing a fabricated bushing.

Referring now to FIG. 2, there is shown the fabricated bushing assembly resulting from the fabrication of the bushing segments 7, 8, 9, 10 and 12 of FIG. 1.

As the final step of the present novel method of fabricating a valve bushing, the fabricated bushing of FIG. 2 is machine tapered on the outside as at 13 to adapt the bushing assembly for press fitting into a valve cavity. The end pieces 12 and 10 are beveled as at 14 to facilitate insertion of the O-rings (not shown) into the bore 2 of the fabricated valve bushing. Thereafter, the inside diameter of the fabricated bushing is reamed or honed to provide for alignment of the bore 2 with the above-described O-rings.

Having now described the invention, what we claim as new and desire to secure by Letters Patent is:

1. The method of fabricating a valve bushing having passages extending therethrough at intervals along its length, comprising:

(a) pressing and sintering from powdered metal a plurality of tubular bushing segments each terminating at one end in a plane perpendicular to the segment axis, and terminating at the other end in a plane perpendicular to the segment axis, said other end having therein a plurality of grooves radially disposed with respect to the segment axis and formed shallow in depth and large in width at the inner diameter of the segment and gradually increasing in depth and decreasing in width in the direction toward the outside diameter of the segment to provide a large bonding area on the ungrooved portion of said other end and to maintain the cross-sectional area of each groove substantially constant along its length, (b) forming an end segment having planar ends perpendicular to its axis, (c) applying a bonding agent to the ungrooved portions of said other end of each segment and to one end of said end segment, (d) assembling said plurality of segments and said end segment in abutting end-to-end coaxial relationship with the ungrooved end of each segment disposed against the plane end of the adjacent segment and with said one end of the end segment abutting the grooved end of the assembled plurality of segments, and (e) heating the assembled segments to cure said bonding agent.

2. The method of claim 1, including the steps of shortening selected ones of said segments at the said one end after the said step of pressing and sintering.

3. The method of claim 1, but further including the step of sizing selected ones of said segments on the outside diameter thereof from said one end along at least a portion of their length, after the pressing and sintering operation.

4. The method of claim 1, but further including the step of shortening at one end first selected ones of said segments, after pressing and sintering, sizing other and selected ones of said segments which may include said first selected ones of said segments on the outside diameter thereof from said one end along at least a portion of its length.

5. The method of claim 1, but further including the step of fitting the fabricated bushing into a valve body cavity and centrally reaming the fabricated bushing.

References Cited

UNITED STATES PATENTS

| 2,401,483 | 6/1946 | Hensel et al. | 29—420 X |
| 2,517,061 | 8/1950 | Stackelberg. | |
| 2,705,829 | 4/1955 | Mock | 29—157.1 X |
| 2,807,437 | 9/1957 | Roush. | |
| 2,910,081 | 10/1959 | Karbowniczek | 251—324 |
| 3,103,739 | 9/1963 | Moog | 29—157.1 |

FOREIGN PATENTS 1,201,542  12/1959  France.

JOHN F. CAMPBELL, *Primary Examiner.*

P. M. COHEN, J. D. HOBART, *Assistant Examiners.*